UNITED STATES PATENT OFFICE.

MATTHEW SLEIGHT, OF LEE'S MILLS, NORTH CAROLINA.

REMEDY FOR HOG-CHOLERA.

SPECIFICATION forming part of Letters Patent No. 320,096, dated June 16, 1885.

Application filed August 30, 1884. (Specimens.)

*To all whom it may concern:*

Be it known that I, MATTHEW SLEIGHT, a citizen of the United States, residing at Lee's Mills, in the county of Washington and State of North Carolina, have invented a new and useful composition of matter to be used as a remedy for many of the diseases common to horses, hogs, cattle, sheep, and fowls, of which the following is a specification.

My composition consists of the following ingredients, combined in the proportions stated, viz: two pounds inner bark of red oak, two pounds inner bark of poplar, two pounds inner bark of red ash, one pound inner bark of sourwood, (*Andromeda arborea,*) one pound red-dogwood bark, one pound leaf tobacco, one pound copperas, one pound saltpeter, one pound common sulphur, one pound common sal-soda, and half a pound sage-leaves. These ingredients are to be ground to a fine powder, first being dried, and then thoroughly mingled and kept dry, used by mixing with the animal's food, as follows, viz.: three tablespoonfuls every other night.

In using the above-named composition the animal should be kept in a dry place and never exposed to inclement weather.

By the use of the above composition the animal is soon relieved from the effects of worms, bots, colic, scouring, and all diseases of the animals named caused by impure blood. It greatly increases the appetite, and when properly used will tend to make the animal fatten very rapidly.

What I claim, and desire to secure by Letters Patent of the United States, is—

The herein-described composition of matter to be used as a remedy for diseases of horses, hogs, cattle, sheep, and fowls, consisting of red-oak bark, poplar bark, red-ash bark, sourwood bark, red-dogwood bark, leaf tobacco, copperas, saltpeter, sulphur, sal-soda, and sage-leaves, in the proportions specified.

MATTHEW X SLEIGHT.
his mark.

Witnesses:
M. J. NORMAN,
S. H. ELLISON.